United States Patent
Kuo et al.

(10) Patent No.: US 8,854,571 B2
(45) Date of Patent: Oct. 7, 2014

(54) BACKPLATE, BACKLIGHT MODULE USING THE SAME AND LIQUID CRYSTAL DISPLAY DEVICE

(71) Applicant: Shenzhen China Star Optoelectronics Technology Co., Ltd., Guangdong (CN)

(72) Inventors: Yicheng Kuo, Guangdong (CN); Weifeng Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 115 days.

(21) Appl. No.: 13/703,034

(22) PCT Filed: Nov. 16, 2012

(86) PCT No.: PCT/CN2012/084762
§ 371 (c)(1),
(2), (4) Date: Dec. 10, 2012

(87) PCT Pub. No.: WO2014/056273
PCT Pub. Date: Apr. 17, 2014

(65) Prior Publication Data
US 2014/0098324 A1    Apr. 10, 2014

(30) Foreign Application Priority Data
Oct. 9, 2012 (CN) .......................... 2012 1 0378655

(51) Int. Cl.
*G02F 1/1335* (2006.01)
*F21V 8/00* (2006.01)

(52) U.S. Cl.
CPC ............ *G02B 6/0085* (2013.01); *G02B 6/0068* (2013.01); *G02F 1/133615* (2013.01); *G02B 6/0091* (2013.01)
USPC .......................................................... 349/58

(58) Field of Classification Search
USPC ...................................................... 349/58, 65
See application file for complete search history.

(56) References Cited

U.S. PATENT DOCUMENTS 8,164,704 B2 * 4/2012 Kim et al. ....................... 349/58

* cited by examiner

*Primary Examiner* — James Dudek

(57) ABSTRACT

This invention discloses a backplate comprising a sheet metal member with a hollow structure and an aluminum extrusion heatsink connected to the end of the sheet metal member. This aluminum extrusion heatsink includes a lateral light source connection portion provided with a light source and a sheet metal member connection portion connected to the lateral light source connection portion, wherein the latter is in contact with the sheet metal member. The aluminum extrusion heatsink further includes two heat-dissipation extension portions respectively arranged at both ends of the sheet metal member connection portion and extending in a length direction of the sheet metal member. Herein, the heat-dissipation extension portion at both ends of the aluminum extrusion heatsink can enhance the heat dissipation effect at the corner region. When the backplate is applied to a liquid crystal display device, it can reduce the stress concentration degree at the corner region thereof.

9 Claims, 3 Drawing Sheets

BACKPLATE, BACKLIGHT MODULE USING THE SAME AND LIQUID CRYSTAL DISPLAY DEVICE

FIELD OF THE INVENTION

The present invention, belonging to the technical field of liquid crystal display, relates to a backplate with hollow structure design. More specifically, the present invention relates to the above-mentioned backplate with an improved heat dissipation effect as well as a backlight module and a liquid crystal display device provided with the same.

BACKGROUND

The existing liquid crystal display device includes such structural members as a front frame, a liquid crystal display panel, a rubber frame, an optical diaphragm, a light guide plate, a light source and a backplate. Wherein the backplate is of a hollow structure design (FIG. 1), which is conducive to reduce the weight of the entire module and to save the cost. Meanwhile, this backplate with the hollow design can immediately dissipate the heat generated by the light source during light emitting as well. However, although the hollow design can improve the heat dissipation effect, the light source has an uneven temperature distribution on the hollow backplate. Specifically, the temperature of the light source in the center is higher than that at both ends, which causes the liquid crystal panel to have too concentrated stress at the corner and is thus disadvantageous to the long-term use of the liquid crystal panel.

SUMMARY OF THE INVENTION

Aiming at the defect in the prior art that the light source has an uneven temperature distribution on the hollow backplate, which causes the liquid crystal panel to have too concentrated stress at the corner and is thus disadvantageous to the long-term use off the liquid crystal panel, the technical problem to be solved by the present invention is to provide a backplate as well as a liquid crystal display device using the same, wherein the backplate can enhance the corner heat dissipation effect, thus reducing the stress concentration degree and thereby protecting the liquid crystal panel.

The present invention resolves its technical problem through the following technical solutions: a backplate, comprising: a sheet metal member having a hollow structure and an aluminum extrusion heatsink connected to an end of the sheet metal member; wherein the aluminum extrusion heatsink includes a lateral light source connection portion provided with a light source and a sheet metal member connection portion connected to the lateral light source connection portion; the sheet metal member connection portion is in contact with a surface of the sheet metal member;

the aluminum extrusion heatsink further includes two heat-dissipation extension portions respectively arranged at both ends of the sheet metal member connection portion and extending in a length direction of the sheet metal member.

In the above-mentioned backplate, the heat-dissipation extension portion extends in the length direction of the sheet metal member along its surface.

In the above-mentioned backplate, a distance of the heat-dissipation extension portion extending in the length direction of the sheet metal member is no more than ⅙ of the length of the sheet metal member.

In the above-mentioned backplate, the heat-dissipation extension portion further extends in a width direction of the sheet metal member to a hollow portion of the sheet metal member.

In the above-mentioned backplate, a distance of the heat-dissipation extension portion extending in the width direction of the sheet metal member is no more than ¼ of the width of the sheet metal member.

In the above-mentioned backplate, the heat-dissipation extension portion is detachably connected to the sheet metal member connection portion.

In the above-mentioned backplate, the heat-dissipation extension portion has higher thermal conductivity than that of the sheet metal member connection portion.

In the above-mentioned backplate, the heat-dissipation extension portion is integrally molded with the sheet metal member connection portion.

According to another aspect of the present invention, a liquid crystal display device is provided.

When implementing the present invention, the following advantageous effects can be achieved: the heat-dissipation extension portion at both ends of the aluminum extrusion heatsink can extend in the length direction of the sheet metal member so as to increase the surface area of heat dissipation at the corner of the aluminum extrusion heatsink, thus enhancing the heat dissipation effect at the corner and improving the heat dissipation uniformity of the light source mounted on the aluminum extrusion heatsink; when the backplate is applied to the liquid crystal display device, it can reduce the stress concentration degree of the liquid crystal panel at its corner region since the cooling is more even, which is advantageous to prolong the service life of the liquid crystal panel. The backplate of the present invention is simple in structure and convenient in assembly when applied to the liquid crystal module, thereby having a significant practical value.

BRIEF DESCRIPTION OF THE DRAWINGS

The present invention will further be described below in detail with reference to appended drawings and specific embodiments. In the drawings:

FIG. 2b is a separate view of the aluminum extrusion heatsink included in the backplate as shown in FIG. 2a;

FIG. 3b is a separate view of the aluminum extrusion heatsink included in the backplate as shown in FIG. 3a;

DETAILED DESCRIPTION OF THE PREFERRED EMBODIMENT

In order to understand the purpose, technical solutions and effects of the present invention more clearly, the present invention will further be described below in detail with reference to appended drawings and specific embodiments. It should be understood that the following embodiments are used only for explaining the present invention rather than for limiting the present invention.

Before detailed explanation, the orientations in the present invention are defined as follows: the orientation where the backplate is located refers to the rear, while the orientation where the liquid crystal display panel is located refers to the front.

The present invention provides a backplate that can achieve the heat dissipation more evenly. The aluminum extrusion heatsink of this backplate has a heat-dissipation extension portion extending in the length direction of the sheet metal member, which enables the heat generated by the light source and gathered at the corner region in the prior art to be dissipated more effectively, thus reducing the stress concentration degree at the corner of the liquid crystal panel. The backplate of the present invention will be explained in detail in the following.

Embodiment 1

Figure 1:
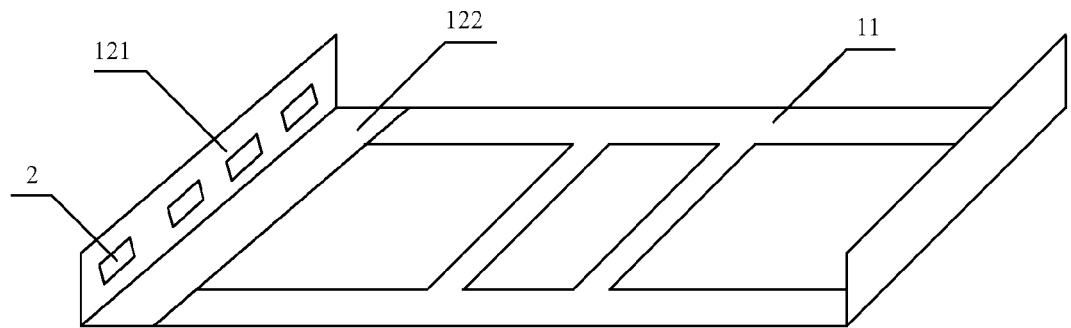
FIG. 1 is a schematic diagram of the backplate with hollow structure design in the prior art.
Figure 2A:
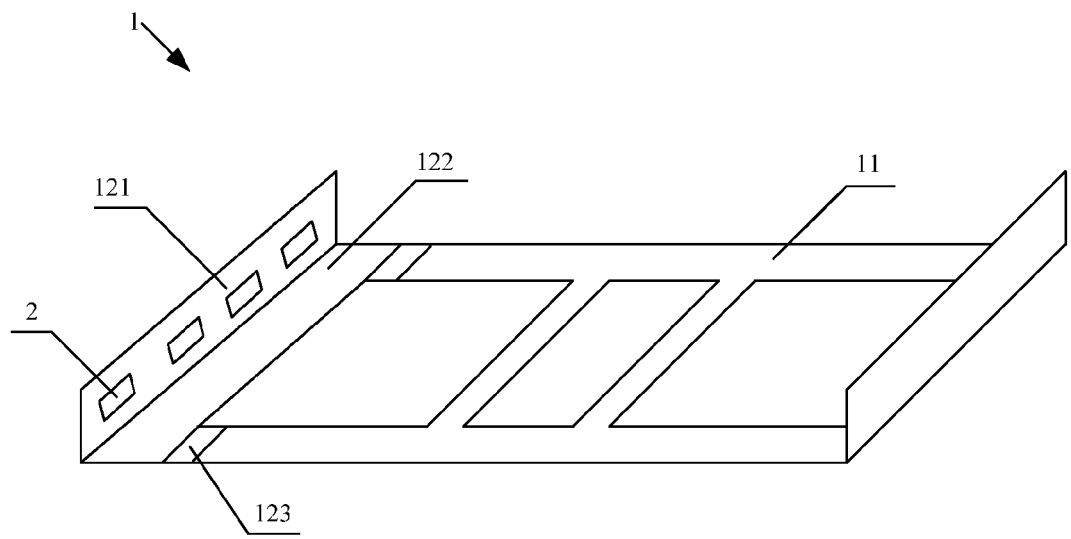
FIG. 2a is a structural diagram of the backplate according to Embodiment 1 of the present invention.
Figure 2B:
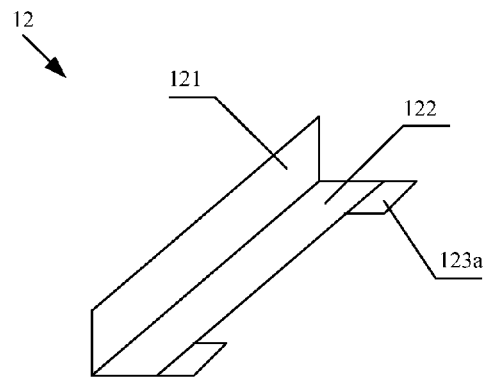

FIGS. 2a-2b show a backplate 1 and a specific aluminum extrusion heatsink 12 provided by the present invention. This backplate 1 includes a sheet metal member 11 having a hollow structure and an aluminum extrusion heatsink 12 connected to one end of the sheet metal member 11. It can be known from the figures that the sheet metal member 11 is of an "Π" shape, with the aluminum extrusion heatsink 12 connected to the end region of the two long sides of the sheet metal member 11. The design of the hollow structure can make the heat generated by the light source 2 corresponding to the hollow portion be dissipated quickly. However, in comparison, the heat at the position where the sheet metal member 11 is connected with the aluminum extrusion heatsink 12 (if assembled in a liquid crystal display device, this position is corresponding to the corner region of the liquid crystal display device as mentioned above) is dissipated more slowly. This problem is resolved as follows through the structural design of the aluminum extrusion heatsink.

The aluminum extrusion heatsink 12 of this embodiment includes a lateral light source connection portion 121 provided with a light source 2 and a sheet metal member connection portion 122 connected to the lateral light source connection portion 121. In this embodiment, the light source is only arranged at one side of the aluminum extrusion heatsink 12, which means the light enters from a single side. The sheet metal member connection portion 122 is connected to the end region of the two long sides of the sheet metal member 11, and it is also in contact with the surface of the sheet metal member 11. Herein, the sheet metal member connection portion 122 is in the shape of rectangular, and it is perpendicular to the long side (or the length direction) of the sheet metal member 11. For enhancing the heat dissipation at the corner region, the aluminum extrusion heatsink 12 further includes two heat-dissipation extension portions 123a arranged at both ends of the sheet metal member connection portion 122 and extending in the length direction of the sheet metal member 11. In this embodiment, the heat-dissipation extension portion 123a extends in the length direction of the sheet metal member 11 along the surface of the sheet metal member 11, and it is in contact with this surface. The heat-dissipation extension portion 123a increases the effective heat dissipation area at the position where the sheet metal member 11 is connected with the aluminum extrusion heatsink 12, which achieve quicker heat dissipation in this region, thus enabling the entire backplate with the hollow design to have a more even heat dissipation effect. In consideration of the heat dissipation effectiveness, the distance of the heat-dissipation extension portion 123a extending in the above-mentioned length direction is no more than ⅙ of the length of the sheet metal member.

Preferably, the heat-dissipation extension portion 123a and the sheet metal member connection portion 122 in this embodiment are separate components, both of which are detachably connected with each other, wherein the specific connection modes include but not limited to clamp, screw and adhesive connection. More advantageously, the heat-dissipation extension portion 123a has higher thermal conductivity than that of the sheet metal member connection portion 122, and thus the heat generated by the light source can be transferred out more quickly through the heat-dissipation extension portion 123a. As shown in FIG. 2b, this heat-dissipation extension portion 123a extending along the surface of the sheet metal member 11 can get in contact with more hollow portions, thus achieving more effective heat dissipation.

Embodiment 2

Figure 3A:
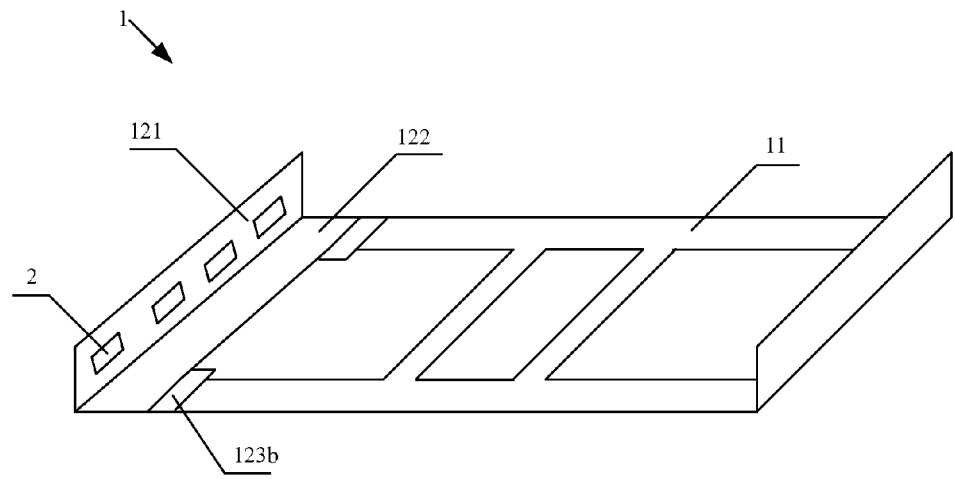
FIG. 3a is another structural diagram of the backplate according to Embodiment 2 of the present invention.
Figure 3B:
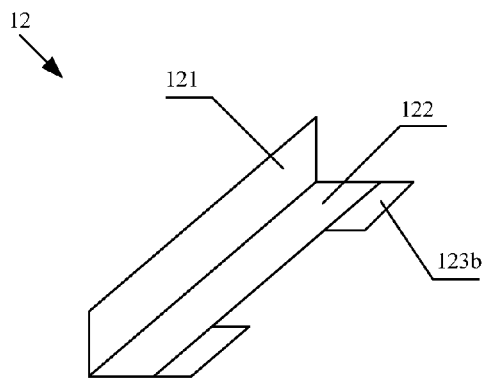

FIGS. 3a-3b show another backplate 1 and a specific aluminum extrusion heatsink 12 provided by the present invention. This backplate 1 includes a sheet metal member 11 having a hollow structure and an aluminum extrusion heatsink 12 connected to both ends of the sheet metal member 11. The connection of the sheet metal member 11 with the aluminum extrusion heatsink 12 is the same as that in Embodiment 1, i.e. the aluminum extrusion heatsink 12 is connected to the end region of the two long sides of the sheet metal member 11. However, since both the aluminum extrusion heatsinks at both ends are provided with a light source, the light enters from both sides in this embodiment. The difference between this embodiment and Embodiment 1 mainly lies in the structural design of the aluminum extrusion heatsink 12.

The aluminum extrusion heatsink 12 includes a lateral light source connection portion 121 provided with a light source 2 and a sheet metal member connection portion 122 connected to the lateral light source connection portion 121. Wherein, the sheet metal member connection portion 122 is connected to the end region of the two long sides of the sheet metal member 11, and it is in contact with the surface of the sheet metal member 11. Herein, the sheet metal member connection portion 122 is likewise in the shape of rectangular, and it is also perpendicular to the long side of the sheet metal member 11 and to the lateral light source connection portion 121. Herein, the aluminum extrusion heatsink 12 further includes a heat-dissipation extension portion 123b arranged at the end region of the sheet metal member connection portion 122. This heat-dissipation extension portion 123b not only extends in the length direction of the sheet metal member 11, but also extends to the hollow portion of the sheet metal member 11 in the width direction thereof. Moreover, it covers a part of the hollow portion of the sheet metal member 11 in this case (FIG. 3b). In this embodiment, the heat-dissipation extension portion 123b and the sheet metal member connection portion 122 are integrally molded together and thus have the same thermal conductivity. Herein, the heat-dissipation extension portion 123b contributes to heat dissipation by increasing the effective heat dissipation area at the position where the sheet metal member 11 is connected with the aluminum extrusion heatsink 12. Besides, the heat-dissipation extension portion 123b which covers the hollow portion facilitates the heat dissipation process due to the direct contact with the air, which can also improve the heat dissipation effect in this region significantly and thus carry out the heat dissipation in more uniform way in the entire backplate with the hollow design.

In order not to affect the heat dissipation effect of the light source in the central region of the lateral light source connection portion 121, the heat-dissipation extension portion 123b should not cover the hollow portion of the sheet metal member 11 too much. The present invention defines that the distance of the heat-dissipation extension portion 123b extending in the width direction of the sheet metal member 11 is no more than ¼ of the width of the sheet metal member 11, so as to make use of the original hollow design and the heat-dissipation extension design of the present invention at the same time.

In the view direction as shown in FIG. 3b, the heat-dissipation extension portion 123b can have various designs of shapes, such as the trapezoid shape shown in FIG. 3b. Its shape, for example but not limited to, may be rectangular (FIG. 3d), semicircular or of other geometric shapes. However, it should be noted that this heat-dissipation extension portion should not go beyond the edge defined by the sheet metal member 11 for convenient assembly.

Figure 4:
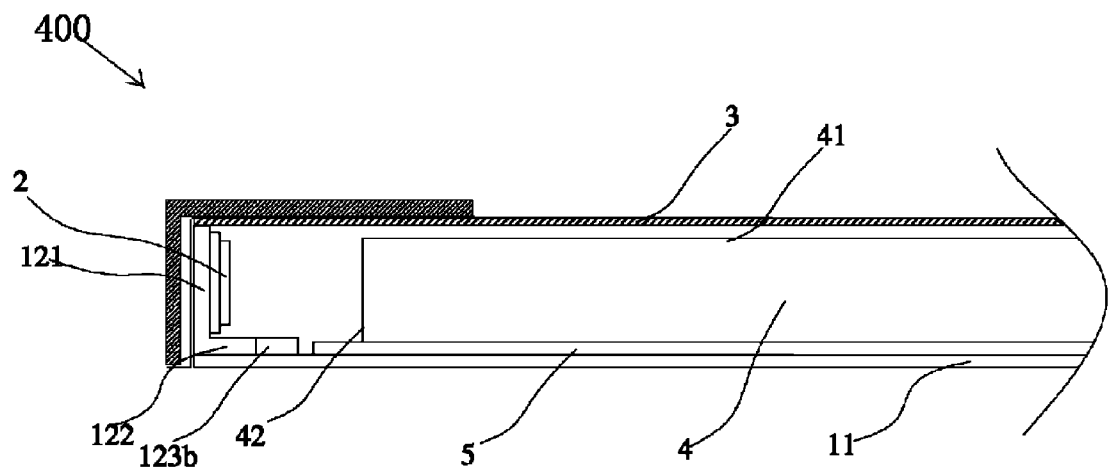
FIG. 4 is a schematic diagram of the backlight module that adopts the Embodiment 2 of the present invention.

FIG. 4 is a schematic diagram of a backlight module including the backplate of Embodiment 2 of the present invention. This backlight module 400 includes a backplate 1, as well as an optical diaphragm 3, a light guide plate 4 and a reflection sheet 5 successively arranged from top to bottom on the backplate 1, wherein the light guide plate 4 has a light-exiting top surface 41 as well as a light-entering side 42 adjacent to the light-exiting top surface 41. The backplate 1 has the structure as described in detail in Embodiment 2, which includes a sheet metal member 11 and an aluminum extrusion heatsink 12 with the light source on the aluminum extrusion heatsink 12 located between a lateral light source connection portion 121 of the aluminum extrusion heatsink 12 and the light-entering side 41. Herein, there will not be any more detailed explanation of the specific structure of the backplate 1, especially the structure of the aluminum extrusion heatsink 12.

Figure 5:
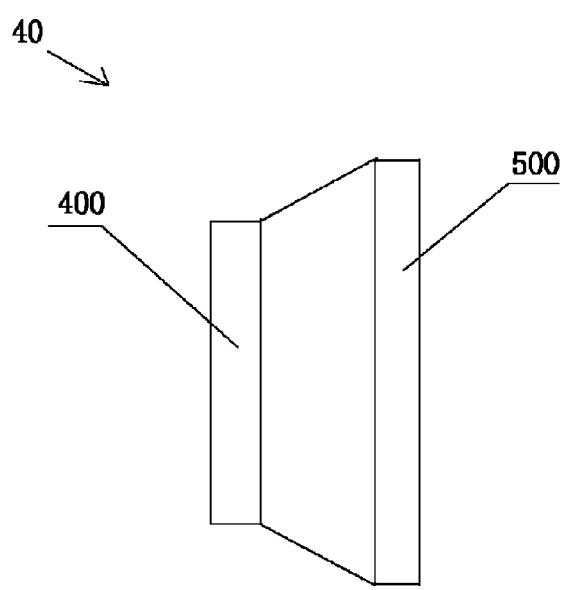
FIG. 5 is a schematic diagram of the liquid crystal display device including the backlight module as shown in FIG. 4.

Besides, the present invention further provides a liquid crystal display device (FIG. 5), which includes a liquid crystal display panel and a backlight module located at the rear of this liquid crystal display panel. The backlight module here has the structure as shown in FIG. 4. Because the aluminum extrusion heatsink with the above-mentioned structural design can enhance the heat dissipation effect at the corner region and improve the heat dissipation evenness of the entire backplate, it can be guaranteed to provide good lighting effect for the liquid crystal display panel, thus finally improving the display effect of the liquid crystal display device.

The invention claimed is:

1. A backplate, comprising: a sheet metal member having a hollow structure and an aluminum extrusion heatsink connected to an end of the sheet metal member; wherein the aluminum extrusion heatsink includes a lateral light source connection portion provided with a light source and a sheet metal member connection portion connected to the lateral light source connection portion; the sheet metal member connection portion is in contact with a surface of the sheet metal member; wherein
   the aluminum extrusion heatsink further includes two heat-dissipation extension portions respectively arranged at both ends of the sheet metal member connection portion and extending in a length direction of the sheet metal member; a distance of the heat-dissipation extension portion extending in the length direction of the sheet metal member is no more than ⅙ of the length of the sheet metal member.

2. The backplate according to claim 1, wherein the heat-dissipation extension portion extends in the length direction of the sheet metal member along its surface.

3. The backplate according to claim 1, wherein the heat-dissipation extension portion further extends in a width direction of the sheet metal member to a hollow portion of the sheet metal member.

4. The backplate according to claim 3, wherein a distance of the heat-dissipation extension portion extending in the width direction of the sheet metal member is no more than ¼ of the width of the sheet metal member.

5. The backplate according to claim 1, wherein the heat-dissipation extension portion is detachably connected to the sheet metal member connection portion.

6. The backplate according to claim 5, wherein the heat-dissipation extension portion has higher thermal conductivity than that of the sheet metal member connection portion.

7. The backplate according to claim 1, wherein the heat-dissipation extension portion is integrally molded with the sheet metal member connection portion.

8. A backlight module, comprising: a backplate as well as an optical diaphragm, a light guide plate and a reflection sheet successively arranged from top to bottom on the backplate; the light guide plate has a light-exiting top surface as well as a light-entering side adjacent to the light-exiting top surface;
   the backplate includes a sheet metal member with a hollow structure and an aluminum extrusion heatsink connected to the end of the sheet metal member; wherein the aluminum extrusion heatsink includes a lateral light source connection portion provided with a light source and a sheet metal member connection portion connected to the lateral light source connection portion, and the sheet metal member connection portion is in contact with the sheet metal member; the light source is located between the lateral light source connection portion and the light-entering side; wherein the aluminum extrusion heatsink further includes two heat-dissipation extension portions respectively arranged at both ends of the sheet metal member connection portion and extending in a length direction of the sheet metal member; a distance of the heat-dissipation extension portion extending in the length direction of the sheet metal member is no more than ⅙ of the length of the sheet metal member.

9. A liquid crystal display device, comprising a liquid crystal display panel, wherein the liquid crystal display device further includes a backlight module of claim 8.

* * * * *